United States Patent
Guernsey et al.

(10) Patent No.: US 7,147,099 B2
(45) Date of Patent: Dec. 12, 2006

(54) SPROCKETS IN A CLEANABLE MODULAR BELT CONVEYOR

(75) Inventors: Kevin W. Guernsey, Kenner, LA (US); Christopher J. Verdigets, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 107 days.

(21) Appl. No.: 10/709,328

(22) Filed: Apr. 28, 2004

(65) Prior Publication Data

US 2005/0241921 A1 Nov. 3, 2005

(51) Int. Cl.
*B65G 23/06* (2006.01)

(52) U.S. Cl. .................. 198/834; 198/835; 198/495; 474/155

(58) Field of Classification Search .............. 198/495, 198/834, 835; 474/153, 155, 160, 164
See application file for complete search history.

(56) References Cited

U.S. PATENT DOCUMENTS

| | | |
|---|---|---|
| 1,201,748 A | 10/1916 | Luce |
| 1,835,406 A | 12/1931 | Kirsten |
| 1,841,925 A | 1/1932 | Woodbury |
| 2,451,690 A | 10/1948 | Oehler ........................ 74/243 |
| 3,674,130 A | 7/1972 | Carmichael ................. 198/195 |
| 3,815,439 A | 6/1974 | Tarutani ....................... 74/611 |
| 4,089,406 A | 5/1978 | Teske et al. ................ 198/730 |
| 4,964,842 A | 10/1990 | Howard ...................... 474/152 |
| 5,170,883 A | 12/1992 | Ledet et al. ................ 198/834 |
| 5,263,575 A * | 11/1993 | Ledet .......................... 198/834 |
| 5,316,522 A | 5/1994 | Carbone et al. ............. 474/95 |
| 5,322,478 A | 6/1994 | Bos et al. ..................... 474/95 |
| 5,389,044 A | 2/1995 | Bandy, Jr. et al. ........... 474/96 |
| 5,469,958 A | 11/1995 | Gruettner et al. ........... 198/834 |
| 6,740,172 B1 | 5/2004 | Griffiths et al. ............... 134/15 |
| 2002/0108840 A1 | 8/2002 | Layne et al. ................ 198/832 |
| 2003/0144098 A1 | 7/2003 | Fye et al. ..................... 474/95 |
| 2005/0061633 A1* | 3/2005 | Vetter ......................... 198/834 |
| 2005/0199471 A1* | 9/2005 | Barrett ....................... 198/495 |

* cited by examiner

*Primary Examiner*—James R. Bidwell
(74) *Attorney, Agent, or Firm*—James T. Cronvich

(57) ABSTRACT

An easy-to-clean conveyor with sprockets that reveal the hinge area of a modular conveyor belt to a fluid spray. A conveyor includes a modular belt constructed of rows of belt modules hingedly linked together in series by hinge pins into an endless belt loop. A sprocket, mounted on a shaft for rotation, engages an inner surface of the belt in driving or driven contact. The sprocket extends from a central bored hub to an outer periphery, which is arranged to engage the inner surface of the belt along an area of contact that varies laterally across the inner surface of the belt in each rotation of the sprocket.

42 Claims, 5 Drawing Sheets

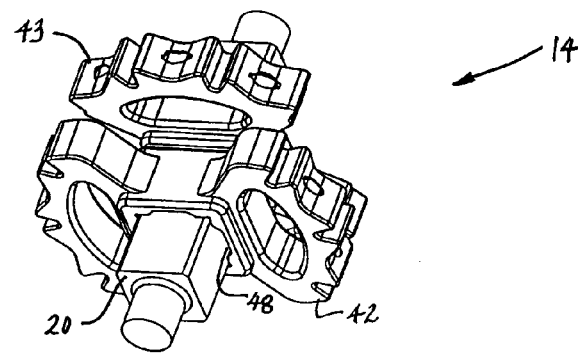
FIG. 2A
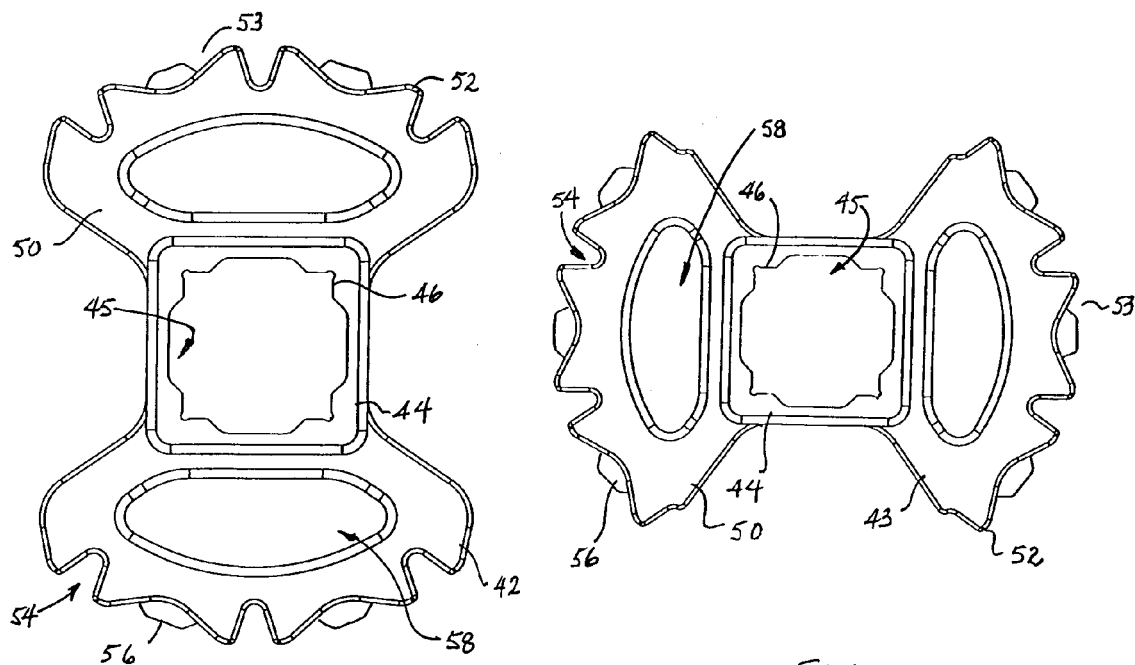
FIG. 2B
FIG. 2C

SPROCKETS IN A CLEANABLE MODULAR BELT CONVEYOR

BACKGROUND OF INVENTION

The invention relates generally to power-drive conveyors and, more particularly, to modular belt conveyors that articulate about a sprocket having an outer periphery that does not lie in a single plane normal to the axis of rotation of the sprocket.

Modular conveyor belts constructed of rows of plastic belt modules linked together at hinge joints by hinge pins are often used to convey meat, poultry, and other agricultural products. To comply with USDA and other sanitation requirements, belts in these applications must be cleaned continuously. The hinge joint between consecutive rows of belt modules is one of the most difficult areas to clean. Nooks and crannies in the hinge harbor bacteria shaded from cleaning water sprays. Furthermore, the teeth of conveyor drive sprockets compact fat, blood, and other debris into the hinge. As the belt articulates about sprockets on its transition from carryway to returnway, the hinges open to provide larger openings between the inner surface of the belt loop and the outer surface. For that reason, water sprays are often aimed at the underside of the hinge in the vicinity of the sprockets. Unfortunately, conventional sprockets shade the portions of the hinge along the lines of contact of the sprockets with the inner belt surface.

This problem has been addressed, for example, by the Kwik-Klean Belt Washer sold by Water Management Resources of O'Fallon, Ill., USA. In that device, a modular conveyor belt passes over and around at least one sprocket carried on a non-rotating hollow shaft. The motion of the belt causes the sprocket to rotate. The sprocket includes a first pair of diametrically opposed sectors and a second pair of diametrically opposed sectors that are laterally staggered in relation to the first pair of sectors. Each sprocket is flanked by a pair of nozzles, each of which produces a fan-shaped spray. The fan-shaped sprays overlap one another across the lateral extent of the belt so that the entire breadth of the belt is cleaned. The staggered sector design of the sprockets ensures that all sections of the belt are exposed to the spray. The nozzles are positioned to clean the hinges of the belt when they are open. But, because the hollow shaft is stationary, it cannot operate as a drive shaft.

Thus, there is a need for a conveyor whose hinges can be thoroughly cleaned at drive sprockets as well as at idler sprockets.

SUMMARY OF INVENTION

This need, as well as others, is satisfied by a conveyor embodying features of the invention. One version of such a conveyor comprises a modular belt constructed of rows of belt modules linked together in series by hinge pins at hinges to form an endless belt loop. The belt loop has an outer conveying surface and an opposite inner surface between laterally spaced side edges. A shaft is aligned along an axis inside the belt loop. A sprocket mounted on the shaft can rotate about the axis. The sprocket includes a hub forming a bore for receiving the shaft. An outer periphery of the sprocket includes circumferentially spaced drive surfaces. An intermediate portion of the sprocket connects the outer periphery to the hub. The outer periphery is arranged to contact the inner surface of the belt along an area of contact that varies laterally across the inner surface of the belt in each rotation of the sprocket.

In another aspect of the invention, a conveyor comprises a similar modular belt and a shaft defining an axis of rotation aligned laterally inside the belt loop. A sprocket mounted on the shaft can rotate with the shaft about the axis of rotation. The sprocket extends from a central hub forming a bore for receiving the shaft to an outer periphery. Drive surfaces are circumferentially spaced on the periphery, which is arranged to contact the inner surface of the belt along an area of contact that varies laterally across the inner surface of the belt in each rotation of the sprocket.

In another version, a conveyor comprises a modular belt constructed of rows of belt modules hingedly linked together in series by hinge pins to form an endless belt loop having an outer conveying surface and an opposite inner surface between laterally spaced side edges. A shaft is aligned along an axis inside the belt loop. A sprocket is mounted on the shaft for rotation about the axis. The sprocket extends from a central hub forming a bore for receiving the shaft to an outer periphery contacting the inner surface of the belt. At least a portion of the outer periphery of the sprocket defines a plane oblique to the axis.

In another aspect of the invention, a sprocket that can be mounted on a shaft to rotate about an axis to engage a conveyor belt comprises a hub and an outer periphery connected by an intermediate portion. The hub forms a bore for receiving a shaft that defines an axis. The outer periphery is for contacting the inner surface of the belt loop. At least a portion of the outer periphery defines a plane oblique to the axis.

According to yet another aspect, a sprocket that can be mounted on a shaft for rotation with the shaft about an axis of rotation to engage the inner surface of a conveyor belt loop comprises a hub and an outer periphery connected by an intermediate portion. The hub forms a bore for receiving a shaft defining an axis of rotation. Drive surfaces for contacting the inner surface of a conveyor belt are spaced circumferentially on the outer periphery, which is arranged to contact the inner surface of the belt along an area of contact that varies laterally across the inner surface of the belt in each rotation of the sprocket.

BRIEF DESCRIPTION OF DRAWINGS

These and other features, aspects, and advantages of the invention are better understood by reference to the following description, appended claims, and accompanying drawings in which:

FIG. 2A is a pictorial view of one version of sprocket usable in the conveyor of FIG. 1 with two separable adjacent sections on a shaft, FIG. 2B is a side elevation view of one of the sections, and FIG. 2C is a side elevation view of the other of the sections;

DETAILED DESCRIPTION

Figure 1:
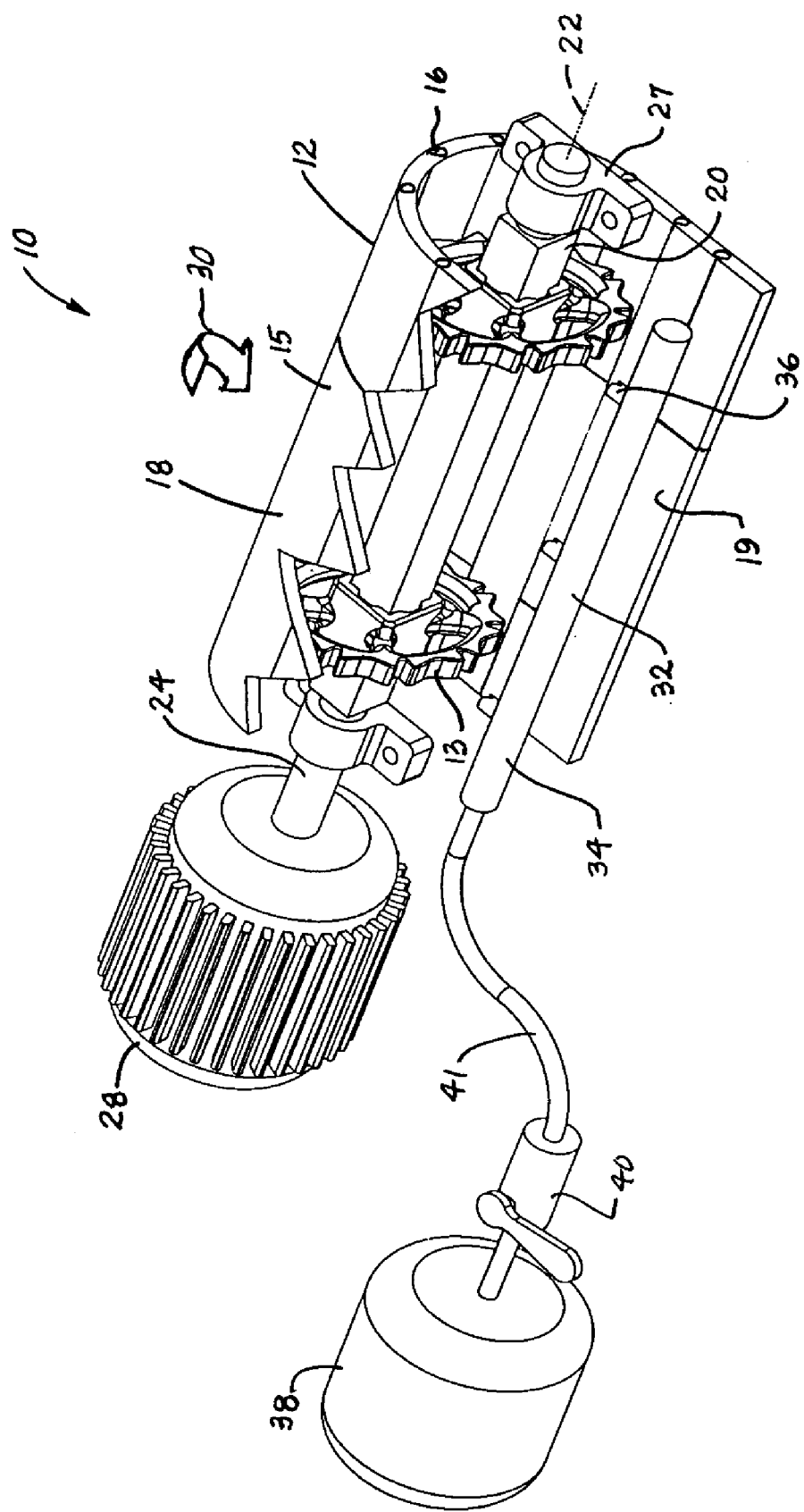
FIG. 1 is a pictorial view of one end of a conveyor embodying features of the invention.

A portion of a conveyor embodying features of the invention is shown in FIG. 1. The conveyor 10 includes a modular plastic conveyor belt 12 articulating about a pair of sprockets 13. The belt is constructed of a series of rows of belt modules 15. Each row includes one or more belt modules; and, if there are multiple modules per row, the belt is preferably laid out in a bricklay pattern. Hinge eyes at the ends of confronting rows of belt modules are interleaved. The aligned eyes form a lateral passageway between each row. A hinge pin 16 fits in each passageway to connect the rows of modules into an endless belt loop. The belt loop extends in thickness from an outer conveying surface 18 to an inner surface 19. The plastic modules making up the belt are typically injection molded out of a thermoplastic material, such as polypropylene, polyethylene, and acetal.

The sprockets are shown in FIG. 1 mounted on a shaft 20 laterally aligned inside the belt loop at an end of a carryway portion of a typical conveying path. The sprockets could be mounted, however, at different locations along the belt path in other applications. The shaft defines an axis 22 about which the sprockets rotate. The shaft shown is a square shaft with round ends 24 supported in bearing blocks 27 at each end. The shaft may be either an idler shaft or a drive shaft. In this example, the shaft is a drive shaft driven by a motor 28 in a direction of belt travel 30.

As the belt articulates about the sprockets in its transition from the upper carryway to the lower returnway, the hinges between belt rows open. A fluid spray system 32 directs fluid into the hinges at the sprockets. The fluid spray system shown in this example includes a laterally arranged pipe 34 with outlets 36 formed along its length. A pressurized source of fluid 38 connects to an end of the pipe through a valve 40 and a hose 41. The outlets may be nozzles or slits in the pipe and may be arranged to provide a selected spray pattern to best clean the belt.

Details of a sprocket 14 usable in the conveyor of FIG.1 are shown in FIGS. 2A–C. Each sprocket consists of two half-sprockets 42, 43. Each half-sprocket has a central hub 44 with a bore 45 through it. The bore shown has four right-angle corners 46 to accommodate a square shaft 20. Recesses 48 between the corners provide access for cleaning the bore and the shaft. Each half-sprocket extends outward from the hub through an intermediate portion 50 to an outer periphery 52. In this version, the outer periphery can be described, in a first approximation, as portions of a circular arc 53. Drive structure, including drive pockets 54 and tracking teeth 56, on the periphery causes the periphery to deviate from a perfectly circular arc. Consequently, the term arc is used for convenience in this context to define the portion, or angular extent, of the periphery of a sector-shaped portion of a sprocket. If, however, the sprocket were not a drive sprocket and did not have to positively track a belt, the outer periphery could be smooth and define a circular arc exactly. The sprocket halves of FIGS. 2B and 2C each define a pair of coplanar peripheral arcs circumferentially offset from each other by 180°. Each arc covers a sector of just over 90°. When both sprocket halves are mounted adjacent to each other on the shaft 20, the peripheral arcs of one are offset 90° with respect to the peripheral arcs of the other. Because the two half-sprockets are separate pieces, they are also offset from each other by the width of the hub. Although the sprocket of FIG. 2 consists of two half-sprockets, they could be realized as three third-sprockets, four quarter-sprockets, and so on, with corresponding peripheral arcs and angular offsets. In an axial view, the periphery looks continuous with a slight overlap at the ends of each arc. Windows 58 in the intermediate portion of the sprocket halves make the sprocket lighter and easier to clean. But the intermediate portion of this sprocket and the other sprockets described could be solid, without windows.

Figure 5A:
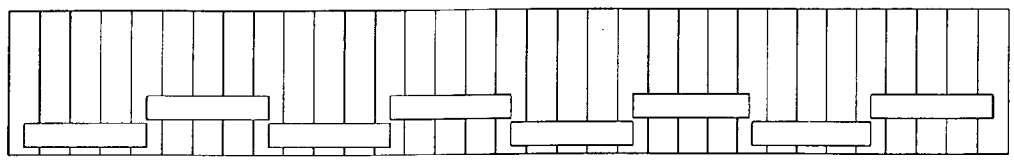
FIGS. 5A, 5B, and 5C depict the area of contact of the sprockets of FIGS. 2, 3, and 4 with the inner surface of a belt loop.

Unlike for a conventional planar sprocket, the periphery of the offset sprocket of FIG. 2A contacts the inner surface of a conveyor belt along an area of contact that varies laterally across the inner surface of the belt in each rotation of the sprocket. FIG. 5A shows the pattern of the area of contact of the sprocket of FIG. 2A on the underside of the belt. The offset pattern repeats every half rotation of the sprocket. The lateral shift means that portions of the inner surface of the belt are not shaded by the sprocket through the complete transition of the belt from the carryway to the returnway. In this way, fluid spray can clean the belt more effectively by accessing the entire width of the belt as it rides around the sprockets.

Figure 3A:
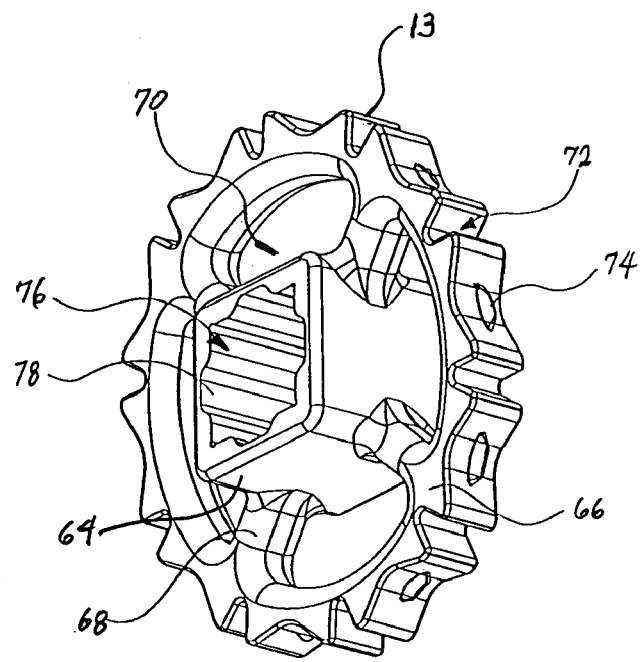
FIG. 3A is a pictorial view of another version of sprocket usable in the conveyor of FIG. 1 with an oblique planar periphery.
Figure 3B:
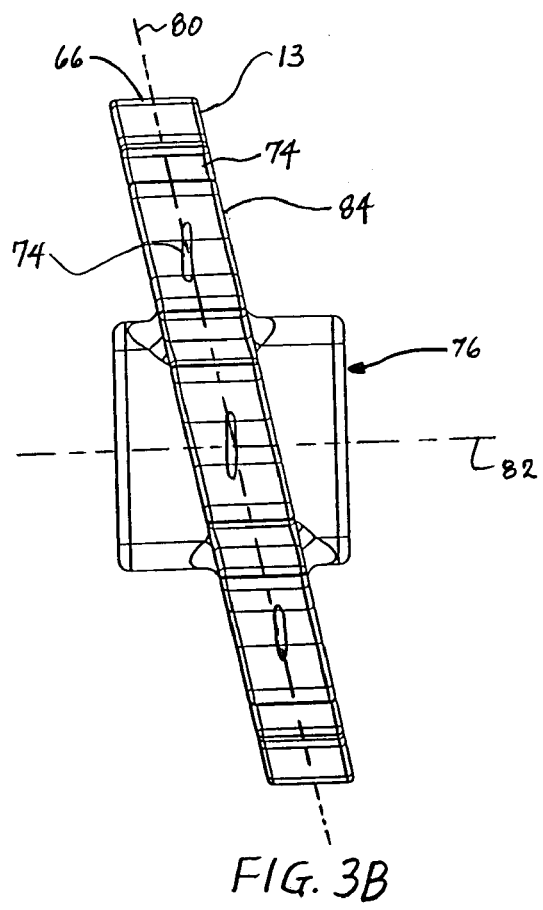
FIG. 3B is a front elevation view of the sprocket of FIG. 3A.

The sprocket 13 illustrated in the conveyor of FIG. 1 is shown in more detail in FIGS. 3A and 3B. The sprocket 13 extends from a central hub 64 to an outer periphery 66. An intermediate portion 68, in the form of spokes separated across windows 70, connects the hub to the outer periphery. Drive structure on the outer periphery includes drive pockets 72 and tracking teeth 74. The drive pockets receive complementary drive faces on the inner surface of the belt. A driving force is transmitted from the pockets to the drive faces on the belt when the sprocket is mounted on a drive shaft. When the sprocket is mounted on an idler shaft, the drive force is transmitted from the belt drive faces to the pockets in the sprocket. The hub also defines a bore 76 to receive the shaft and cleaning recesses 78 along the walls. As shown in FIG. 3B, the periphery of the shaft lies generally in a plane 80 that is oblique to the axis 82 of the bore 76. Because the axis of the periphery is oblique to the axial direction (the lateral direction of the belt), the driving surfaces are oblique to the side edges 84 of the periphery so that they properly engage the complementary structure on the inner belt surface.

Figure 5B:
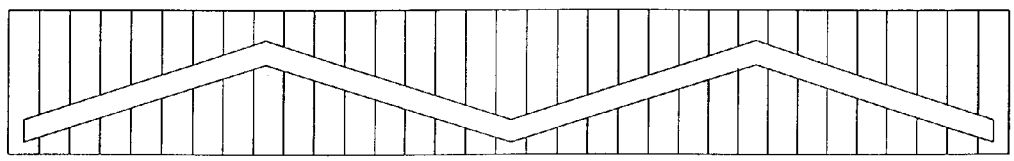

Like the offset sprocket of FIG. 2, the angled sprocket of FIG. 3 engages the belt along an area of contact that varies laterally across the inner surface of the belt during each rotation of the sprocket. The pattern is shown in FIG. 5B. Unlike the pattern (FIG. 5A) of the offset sprocket, the resulting triangular-wave pattern is continuous and repeats every rotation.

Figure 4A:
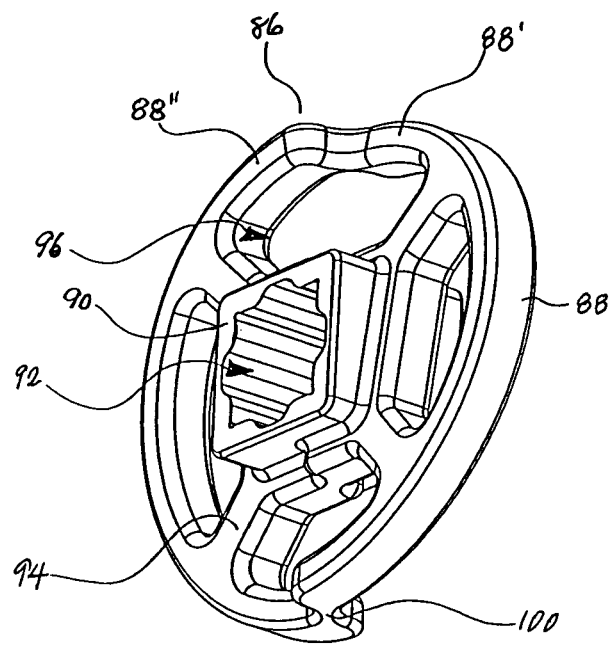
FIG. 4A is a pictorial view of still another version of sprocket usable in the conveyor of FIG. 1 with a pair of oblique sectors forming the periphery.
Figure 4B:
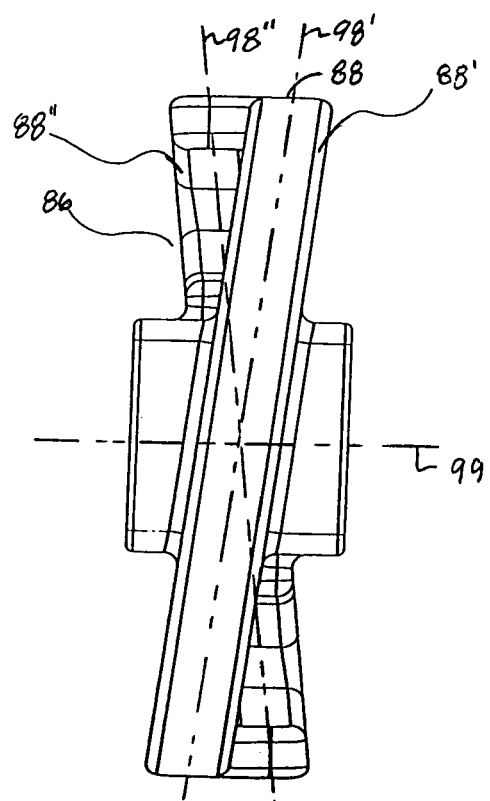
FIG. 4B is a front elevation view of the sprocket of FIG. 4A.
Figure 5C:
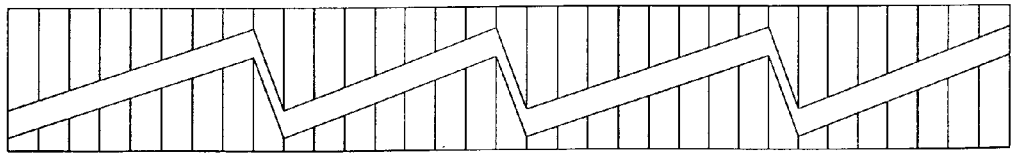

Yet another version of sprocket usable in a conveyor as in FIG. 1 is shown in FIGS. 4A and 4B. In this version, the sprocket 86 is shown without drive structure on its periphery 88. But the periphery could include drive structure like that of the other versions or of any other configuration. The sprocket includes a hub 90 with a central bore 92. The hub connects to the periphery through intermediate structure in the form of spokes 94 separated by windows 96. The periphery consists of two sections 88', 88", each defining circular circumferential areas of about 180°. Each section lies generally in oblique intersecting planes 98', 98", which are also oblique to the axial direction 99 of the bore and, consequently, the lateral dimension of the belt. The ends of each peripheral arc are connected to the ends of the other by connecting portions 100. The area of contact of the split helical periphery of the sprocket of FIGS. 4A and 4B defines a sawtooth pattern along the inner surface of the belt as shown in FIG. 5C. The pattern repeats every half rotation of the sprocket. Because the periphery of the sprocket moves laterally across the inner side of the belt, the sprocket reveals the entire width of the inner surface of the belt for washing.

Although the invention has been described in detail with respect to a few versions, other versions are possible. For example, the drive structure on any of the sprockets may include drive teeth or drive pockets, or the periphery could be smooth or polygonal. The separable half-sprockets of FIG. 2 may be formed unitarily on a single hub. Furthermore, different numbers of sectors, or extents of peripheral arcs, can be used in the offset sprockets to similar effect. As another example, the hubs could define circular or other multi-sided bores, instead of the square bore shown. Instead of rotating with the shafts, the sprockets could be mounted on circular bearings arranged to rotate about stationary circular shafts. So, as these examples suggest, the claims are not meant to be limited to the versions described in detail.

What is claimed is:

1. A conveyor comprising:
   a modular belt constructed of rows of belt modules hingedly linked together in series by hinge pins to form an endless belt loop having an outer conveying surface and an opposite inner surface between laterally spaced side edges;
   a shaft aligned along an axis inside the belt loop;
   a sprocket mounted on the shaft for rotation about the axis, wherein the sprocket includes:
      a hub forming a bore for receiving the shaft;
      an outer periphery defining a first arc and a second arc offset axially and circumferentially from each other and having circumferentially spaced drive structures formed along each of the first and second arcs;
      an intermediate portion connecting the outer periphery to the hub;
   wherein the outer periphery is arranged to contact the inner surface of the belt along an area of contact that varies laterally across the inner surface of the belt in each rotation of the sprocket.

2. A conveyor comprising:
   a modular belt constructed of rows of belt modules hingedly linked together in series by hinge pins to form an endless belt loop having an outer conveying surface and an opposite inner surface between laterally spaced side edges;
   a shaft aligned along an axis inside the belt loop;
   a sprocket mounted on the shaft for rotation about the axis, wherein the sprocket includes:
      a hub forming a bore for receiving the shaft;
      an outer periphery forming circumferentially spaced drive surfaces;
      an intermediate portion connecting the outer periphery to the hub;
   wherein the outer periphery is arranged to contact the inner surface of the belt along an area of contact that varies laterally across the inner surface of the belt in each rotation of the sprocket; and
   wherein the outer periphery of the sprocket generally defines a circle lying in a plane oblique to the axis.

3. A conveyor comprising:
   a modular belt constructed of rows of belt modules hingedly linked together in series by hinge pins to form an endless belt loop having an outer conveying surface and an opposite inner surface between laterally spaced side edges;
   a shaft aligned along an axis inside the belt loop;
   a sprocket mounted on the shaft for rotation about the axis, wherein the sprocket includes:
      a hub forming a bore for receiving the shaft;
      an outer periphery forming circumferentially spaced drive surfaces;
      an intermediate portion connecting the outer periphery to the hub;
   wherein the outer periphery is arranged to contact the inner surface of the belt along an area of contact that varies laterally across the inner surface of the belt in each rotation of the sprocket; and
   wherein the outer periphery of the sprocket defines a first arc lying in a first plane oblique to the axis and a second arc lying in a second plane oblique to the first plane.

4. A conveyor as in claim 3 wherein the outer periphery of the sprocket further includes a connecting portion connecting the first and second arcs.

5. A conveyor as in claim 1 further comprising a fluid spray positioned adjacent the shaft and arranged to direct a spray of fluid at the inner surface of the belt.

6. A conveyor as in claim 1 wherein the outer periphery of the sprocket further defines a third arc circumferentially offset from the first arc.

7. A conveyor as in claim 1 wherein the outer periphery of the sprocket further defines a third arc coplanar with and circumferentially offset from the first arc and a fourth arc coplanar with and circumferentially offset from the second arc.

8. A conveyor as in claim 1 wherein the sprocket comprises two separable portions.

9. A conveyor as in claim 2 further comprising a fluid spray positioned adjacent the shaft and arranged to direct a spray of fluid at the inner surface of the belt.

10. A conveyor as in claim 2 wherein the shaft is a drive shaft for driving the belt.

11. A conveyor comprising:
    a modular belt constructed of rows of belt modules hingedly linked together in series by hinge pins to form an endless belt loop having an outer conveying surface and an opposite inner surface between laterally spaced side edges;
    a shaft aligned laterally inside the belt loop and defining an axis of rotation;
    a sprocket mounted on the shaft for rotation with the shaft about the axis of rotation, wherein the sprocket extends from a hub forming a bore for receiving the shaft to an outer periphery forming circumferentially spaced drive surfaces;
    wherein the outer periphery is arranged to contact the inner surface of the belt along an area of contact that varies laterally across the inner surface of the belt in each rotation of the sprocket.

12. A conveyor as in claim 11 wherein the outer periphery of the sprocket generally defines a circle lying in a plane oblique to the axis of rotation.

13. A conveyor as in claim 11 wherein the outer periphery of the sprocket defines a first arc lying in a first plane oblique to the axis of rotation and a second arc lying in a second plane oblique to the first plane.

14. A conveyor as in claim 13 wherein the outer periphery of the sprocket further includes a connecting portion connecting the first and second arcs.

15. A conveyor as in claim 11 wherein the outer periphery of the sprocket generally defines a first arc and a second arc offset axially and circumferentially from each other.

16. A conveyor as in claim 15 wherein the outer periphery of the sprocket further defines a third arc circumferentially offset from the first arc.

17. A conveyor as in claim 15 wherein the outer periphery of the sprocket further defines a third arc coplanar with and circumferentially offset from the first arc and a fourth arc coplanar with and circumferentially offset from the second arc.

18. A conveyor as in claim 11 wherein the sprocket comprises two separable portions.

19. A conveyor as in claim 11 further comprising a fluid spray positioned adjacent the shaft and arranged to direct a spray of fluid at the inner surface of the belt.

20. A conveyor as in claim 11 wherein the shaft is a drive shaft for driving the belt.

21. A conveyor comprising:
a modular belt constructed of rows of belt modules hingedly linked together in series by hinge pins to form an endless belt loop having an outer conveying surface and an opposite inner surface between laterally spaced side edges;
a shaft aligned along an axis inside the belt loop;
a sprocket mounted on the shaft for rotation about the axis, wherein the sprocket extends from a hub forming a bore for receiving the shaft to an outer periphery contacting the inner surface of the belt;
wherein at least a portion of the outer periphery defines a plane oblique to the axis.

22. A conveyor as in claim 21 wherein the entire outer periphery is generally coplanar.

23. A conveyor as in claim 21 wherein another portion of the outer periphery lines in another plane oblique to the axis.

24. A conveyor as in claim 21 wherein the sprocket further includes teeth spaced around the periphery of the sprocket.

25. A conveyor as in claim 21 wherein the sprocket further includes pockets spaced around the periphery of the sprocket.

26. A conveyor as in claim 21 further comprising a fluid spray positioned adjacent the shaft and arranged to direct a spray of fluid at the inner surface of the belt.

27. A sprocket mountable on a shaft for rotation about an axis and engageable with a conveyor belt loop, the sprocket comprising:
a hub forming a bore for receiving a shaft defining an axis;
an outer periphery for contacting the inner surface of a belt loop;
an intermediate portion connecting the outer periphery to the hub;
wherein at least a portion of the outer periphery defines a plane oblique to the axis.

28. A sprocket as in claim 27 wherein the entire outer periphery is generally coplanar.

29. A sprocket as in claim 27 wherein another portion of the outer periphery lines in another plane oblique to the axis.

30. A sprocket as in claim 27 wherein the sprocket further includes teeth spaced around the periphery of the sprocket.

31. A sprocket as in claim 27 wherein the sprocket further includes pockets spaced around the periphery of the sprocket.

32. A sprocket mountable on a shaft for rotation with the shaft about an axis of rotation and engageable with the inner surface of a conveyor belt loop, the sprocket comprising:
a hub forming a bore for receiving a shaft defining an axis of rotation;
an outer periphery forming circumferentially spaced drive surfaces contacting the inner surface of a belt;
an intermediate portion connecting the outer periphery to the hub;
wherein the outer periphery is arranged to contact the inner surface of the belt along an area of contact that varies laterally across the inner surface of the belt in each rotation of the sprocket.

33. A sprocket as in claim 32 wherein the outer periphery of the sprocket generally defines a circle lying in a plane oblique to the axis of rotation.

34. A sprocket as in claim 32 wherein the outer periphery of the sprocket defines a first arc lying in a first plane oblique to the axis of rotation and a second arc lying in a second plane oblique to the first plane.

35. A sprocket as in claim 34 wherein the outer periphery of the sprocket further includes a connecting portion connecting the first and second arcs.

36. A sprocket as in claim 32 wherein the outer periphery of the sprocket generally defines a first arc and a second arc offset axially and circumferentially from each other.

37. A sprocket as in claim 36 wherein the outer periphery of the sprocket further defines a third arc circumferentially offset from the first arc.

38. A sprocket as in claim 36 wherein the outer periphery of the sprocket further defines a third arc coplanar with and circumferentially offset from the first arc and a fourth arc coplanar with and circumferentially offset from the second arc.

39. A sprocket as in claim 32 wherein the sprocket comprises two separable portions.

40. A conveyor comprising:
a conveyor belt in the form of an endless belt loop having an outer conveying surface and an opposite inner surface between laterally spaced side edges;
a shaft aligned along an axis inside the belt loop;
a sprocket mounted on the shaft for rotation about the axis, wherein the sprocket includes:
a hub forming a bore for receiving the shaft;
an outer periphery forming circumferentially spaced drive surfaces;
an intermediate portion connecting the outer periphery to the hub;
wherein the outer periphery is arranged to contact the inner surface of the belt along an area of contact that varies laterally across the inner surface of the belt in each rotation of the sprocket.

41. A conveyor comprising:
a conveyor belt forming an endless belt loop having an outer conveying surface and an opposite inner surface between laterally spaced side edges;
a shaft aligned laterally inside the belt loop and defining an axis of rotation;
a sprocket mounted on the shaft for rotation with the shaft about the axis of rotation, wherein the sprocket extends from a hub forming a bore for receiving the shaft to an outer periphery forming circumferentially spaced drive surfaces;
wherein the outer periphery is arranged to contact the inner surface of the belt along an area of contact that varies laterally across the inner surface of the belt in each rotation of the sprocket.

42. A conveyor comprising:
a conveyor belt forming an endless belt loop having an outer conveying surface and an opposite inner surface between laterally spaced side edges;
a shaft aligned along an axis inside the belt loop;
a sprocket mounted on the shaft for rotation about the axis, wherein the sprocket extends from a hub forming a bore for receiving the shaft to an outer periphery contacting the inner surface of the belt;
wherein at least a portion of the outer periphery defines a plane oblique to the axis.

* * * * *